(12) United States Patent
Schaefer et al.

(10) Patent No.: US 9,389,110 B2
(45) Date of Patent: Jul. 12, 2016

(54) MEASUREMENT APPARATUS FOR MEASURING THE THROUGHFLOW OF A FLUID

(71) Applicant: Sensus Spectrum LLC, Raleigh, NC (US)

(72) Inventors: Burghardt Schaefer, Mutterstadt (DE); Tuan Chu Anh, Ludwigshafen (DE)

(73) Assignee: Sensus Spectrum LLC, Raleigh, NC (US)

( * ) Notice: Subject to any disclaimer, the term of this patent is extended or adjusted under 35 U.S.C. 154(b) by 145 days.

(21) Appl. No.: 14/094,043

(22) Filed: Dec. 2, 2013

(65) Prior Publication Data
US 2014/0083180 A1    Mar. 27, 2014

Related U.S. Application Data

(63) Continuation of application No. PCT/EP2012/002220, filed on May 24, 2012.

(30) Foreign Application Priority Data

Jun. 1, 2011 (DE) .......................... 10 2011 103 175

(51) Int. Cl.
| | |
|---|---|
| *G01F 1/68* | (2006.01) |
| *G01F 1/684* | (2006.01) |
| *G01F 5/00* | (2006.01) |

(52) U.S. Cl.
CPC .............. *G01F 1/684* (2013.01); *G01F 1/6842* (2013.01); *G01F 5/005* (2013.01)

(58) Field of Classification Search
CPC ......... G01F 1/684; G01F 1/6842; G01F 5/00; G01F 5/005

USPC .......... 73/202.5, 204.21, 204.11, 203, 204.22
See application file for complete search history.

(56) References Cited

U.S. PATENT DOCUMENTS

| | | | |
|---|---|---|---|
| 4,480,467 A | | 11/1984 | Harter et al. |
| 4,776,213 A | * | 10/1988 | Blechinger ............... G01F 5/00 73/114.34 |

(Continued)

FOREIGN PATENT DOCUMENTS

| | | |
|---|---|---|
| DE | 43 40 882 A1 | 6/1995 |
| DE | 195 22 648 A1 | 1/1996 |

(Continued)

OTHER PUBLICATIONS

Authors: Kirti Chandra Sahu and Rama Govindarajan, Title: Stability of flow through a slowly diverging pipe, Date: 2005, Publication: J. Fluid Mech. (2005), vol. 531, Cambridge University Press, pp. 325-334.*

*Primary Examiner* — Lisa Caputo
*Assistant Examiner* — Roger Hernandez-Prewit
(74) *Attorney, Agent, or Firm* — Muncy, Geissler, Olds & Lowe, P.C.

(57) ABSTRACT

A measurement apparatus having a measurement tube and a thermal sensor for measuring a throughflow of a fluid flowing through the measurement tube, the measurement tube having an inlet and an outlet, and also a measurement section, in which the sensor is arranged. The inlet has an inlet internal diameter and the measurement section has a measurement section internal diameter, and whereby the measurement section internal diameter is greater than the inlet internal diameter.

9 Claims, 1 Drawing Sheet

(56) References Cited

U.S. PATENT DOCUMENTS

| | | | |
|---|---|---|---|
| 5,495,872 A * | 3/1996 | Gallagher | F15D 1/025 |
| | | | 138/40 |
| 5,546,794 A | 8/1996 | Kuhn et al. | |
| 5,595,163 A * | 1/1997 | Nogi | F02D 41/0027 |
| | | | 123/494 |
| 5,894,088 A | 4/1999 | Sawada et al. | |
| 6,722,196 B2 | 4/2004 | Lenzing et al. | |
| 2005/0223828 A1 * | 10/2005 | Olin | G01F 1/6842 |
| | | | 73/866.5 |
| 2008/0072979 A1 | 3/2008 | Rosenbaum et al. | |
| 2010/0251815 A1 | 10/2010 | Schnur et al. | |

FOREIGN PATENT DOCUMENTS

| | | | |
|---|---|---|---|
| DE | 100 09 154 A1 | 9/2001 | |
| IL | WO 2011138774 A1 * | 11/2011 | G01F 1/007 |

* cited by examiner

MEASUREMENT APPARATUS FOR MEASURING THE THROUGHFLOW OF A FLUID

This nonprovisional application is a continuation of International Application No. PCT/EP2012/002220, which was filed on May 24, 2012, and which claims priority to German Patent Application No. 10 2011 103 175.1, which was filed in Germany on Jun. 1, 2011, and which are both herein incorporated by reference.

BACKGROUND OF THE INVENTION

1. Field of the Invention

The present invention relates to a measurement apparatus.

2. Description of the Background Art

Anemometers are used to measure flow velocities or flow rates of a fluid flowing through a measuring tube. For low flow velocities at the measuring point, anemometers such as thermal anemometers or hot wire anemometers have a large, which is to say good, measurement resolution, and thus high measurement precision. However, the measurement resolution, and hence the measurement precision, of this thermal anemometer becomes worse with increasing flow velocity.

Thermal anemometers are used in water meters, for example. However, it is necessary to expect wide flow ranges in water meters, which is to say large flow velocity ranges, with the result that the measurement precision of the anemometer decreases as the flow range or flow velocity range increases.

Particularly for use in water meters, therefore, it is desirable for a sensor such as an anemometer to provide a measured value having high precision over a wide flow velocity range, in particular at high flow velocities, of a fluid.

Since the installation length in a given system in which the measurement apparatus is to be installed, such as perhaps a fresh water feed to a residential complex, frequently is predefined, the measurement apparatus should not exceed the predefined installation dimensions.

SUMMARY OF THE INVENTION

It is therefore an object of the present invention to provide a measurement apparatus, comprising a measuring tube and a thermal sensor for measuring the flow rate of a fluid flowing through the measuring tube, that precisely determines the flow velocity of a fluid flowing through the measuring tube over a wide flow velocity range, even at high flow velocities in particular. In addition, it is a further object of the present invention to provide a measurement apparatus of this nature that does not exceed a given installation length.

According to an embodiment of a measurement apparatus includes a measuring tube and a thermal sensor for measuring the flow rate of a fluid flowing through the measuring tube, wherein the measuring tube has an inlet and an outlet, and also has a measurement section in which the sensor is located, wherein the inlet has an inlet inside diameter and the measurement section has a measurement section inside diameter, and the measurement section inside diameter is greater than the inlet inside diameter, wherein the inside diameter of the measuring tube increases steadily from the inlet to the measurement section and tapers steadily from the measurement section to the outlet, and wherein the sensor is located in the region of the measurement section at the inside wall of the measuring tube.

A diameter can be understood to mean both the diameter of a round tube as well as the hydraulic diameter of a tube that is not round.

The invention is based on the fact that the flow velocity in a section of a tube can be reduced by enlarging the cross-sectional area of the tube section.

Since the sensor is located in the region of the measurement section and the measurement section has a greater diameter than the inlet of the measuring tube, the flow velocity of a fluid flowing through the measurement apparatus is reduced in the region of the measurement section so that the flow velocity of the fluid can be sensed with a higher precision in the region of the measurement section than at the inlet of the measuring tube, because the diameter is smaller there. The value of the fluid's flow velocity sensed by the sensor can be converted such that the flow rate in the measuring tube can be stated with high precision. A structurally required installation length for a measurement apparatus is adhered to by the measurement apparatus according to the invention.

In order to avoid undesirable eddies and backflows in the fluid, which could interfere with the measurement result, it is advantageous for the inside diameter of the measuring tube to increase steadily from the inlet to the measurement section, and to taper steadily from the measurement section to the outlet.

A further improvement with regard to avoiding eddies and backflows in the fluid is achieved by the means that preferably the angle $\alpha$ relative to the axis of the measuring tube, at which the measuring tube increases steadily from the inlet to the measurement section and tapers steadily from the measurement section to the outlet, is as small as possible, preferably less than 45°. Ideally, the angle $\alpha$ is less than 30°.

In order to obtain good measurement resolution over a large measurement range, it is advantageous for the ratio of measurement section inside diameter to inlet inside diameter to be in a range from about 1.5 to 6.

A further improvement in measurement precision for a relatively large flow rate range at a given installation length can be achieved with the measurement apparatus according to claim 4, in which an inner tube is arranged in a measuring tube.

This embodiment has the advantage that, for a given installation length of a measurement apparatus and a given diameter ratio of the inner tube measurement section to the inner tube inlet, the increase in the cross-section takes place at a smaller angle than if the measuring tube were to be increased by this cross-sectional ratio in the region of the measurement section. The smaller angle has the result that fewer backflows that could distort the measurement result form in the flow profile, and thus the flow velocity of the fluid can be measured exactly even for relatively high flow velocities of the fluid.

To avoid backflows and eddying, it is advantageous for the inside diameter of the inner tube to increase steadily from the inner tube inlet to the inner tube measurement section and to taper steadily from the inner tube measurement section to the inner tube outlet.

An additional improvement with respect to avoiding backflows and eddies can be achieved in a preferred embodiment by the means that the angle $\beta$, relative to the axis of the inner measuring tube, at which the inner tube increases steadily from the inner tube inlet to the inner tube measurement section and tapers steadily from the inner tube measurement section to the inner tube outlet, is as small as possible, preferably less than 30°.

In order to cover as large a measurement range as possible, it is advantageous for the inside diameter ratio of the inner tube measurement section to the inner tube inlet to be in a range from about 1.5 to 6.

For use of the measurement apparatus as a water meter, it is advantageous for an adjusting device to be provided.

For measurement technology reasons, it is advantageous for the measuring tube and/or the inner tube to have a rectangular or elliptical cross-section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
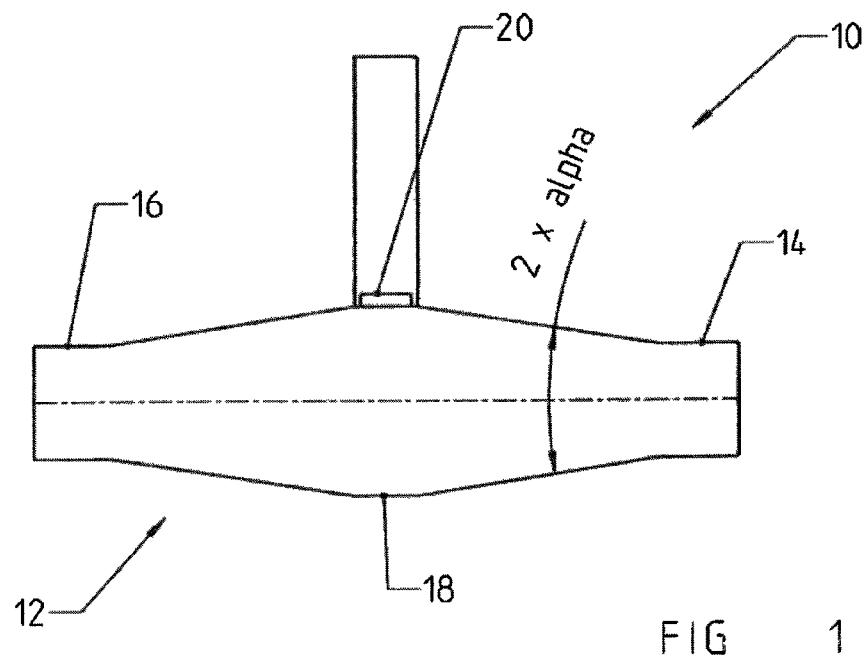
FIG. 1 is a measurement apparatus according to an embodiment.

FIG. 1 shows a measurement apparatus 10, comprising a measuring tube 12 for measuring the flow velocity of a fluid, such as water, flowing through the measuring tube 12. The measuring tube 12 comprises an inlet 14, an outlet 16, and a measurement section 18. A sensor 20 is located at the inner wall of the measuring tube 12 in the region of the measurement section 18. The sensor 20 is a thermal sensor, such as is used in a thermal anemometer, for example.

The inside diameter of the inlet 14 and of the outlet 16 is smaller than the inside diameter of the measurement section 18. The inside diameter of the measuring tube increases steadily from the inlet 14 to the measurement section 18, and then tapers steadily again from the measurement section 18 to the outlet 16. The ratio of the inside diameters of the measurement section to the inlet is approximately 1.5 to 6.

A fluid with a given flow velocity flows through the inlet 14. Because of the expanded inside diameter of the measuring tube 12 in the region of the measurement section 18, the flow velocity at the measuring point where the sensor 20 is located is reduced by the square of the diameter ratio between measurement section 18 and inlet 14. Consequently, the sensor 20 detects a lower flow velocity than the velocity that is present at the inlet 14 of the measuring tube 12.

Since a thermal anemometer can measure low speed fluid flows with higher precision than it can fluid flows with a high speed, the sensor senses the flow velocity of the fluid in the measurement section with a higher precision than it would if it were measuring the flow velocity of the fluid at the inlet 14.

By means of the known inside diameter ratio between the measurement section 18 and inlet 14, the value of the flow rate of the fluid present at the inlet 14 can be stated exactly based on the flow velocity determined by the sensor 20.

Figure 2:
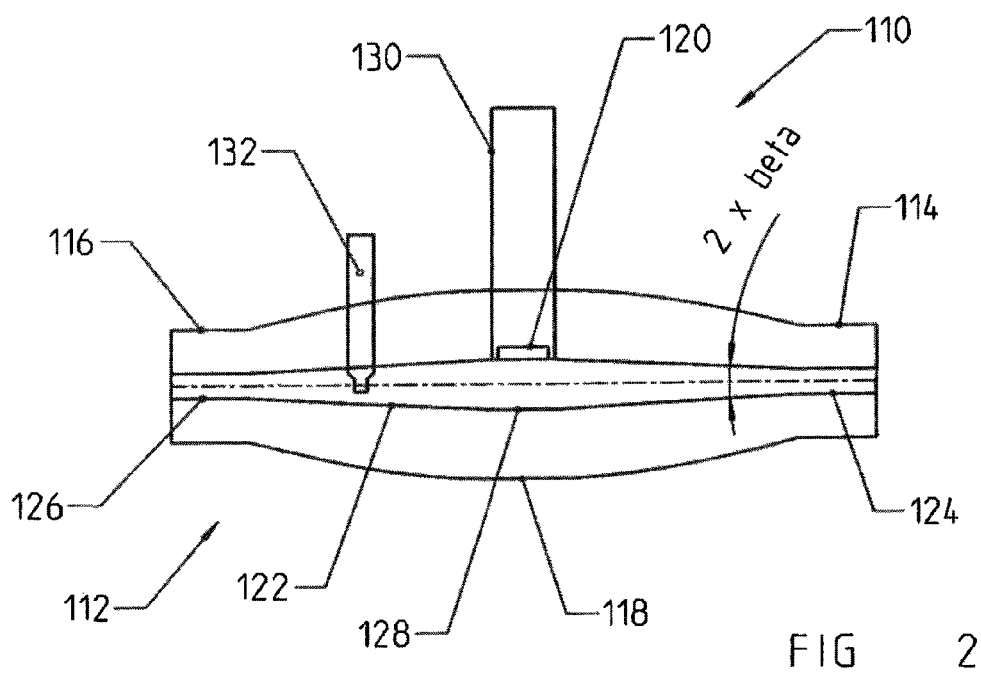
FIG. 2 is a measurement apparatus according to an embodiment.

FIG. 2 shows a measurement apparatus 110 according to another embodiment. The measurement apparatus 110 comprises a measuring tube 112, a sensor 120, such as is used in a thermal anemometer, for measuring the flow velocity of the fluid flowing through the measuring tube 112, such as water, for instance. The measuring tube 112 has an inlet 114, an outlet 116, and a measurement section 118, wherein the inside diameter of the measurement section 118 is greater than the inside diameter of the inlet 114. The inside diameter of the measuring tube 112 increases steadily from the inlet 114 to the measurement section 118, and tapers steadily from the measurement section 118 to the outlet 116. Arranged inside the measuring tube 112 is an inner tube 122, which has an inner tube inlet 124, and inner tube outlet 126, and an inner tube measurement section 128. The inner tube measurement section 128 has a larger inside diameter than the inner tube inlet 124. FIG. 2 shows the inner tube 122 arranged essentially centered in the measuring tube 112. However, positions that are not centered are also possible.

The inside diameter of the inner tube increases steadily from the inner tube inlet 124 to the inner tube measurement section 128, and tapers steadily from the inner tube measurement section 128 to the inner tube outlet 126. The diameter ratio of the inner tube measurement section 128 to the inner tube inlet 124 is in a range from about 1.5 to 6. The sensor 120 is located in the region of the measurement section 118 at the inside wall of the inner tube 122. In order to protect from fluid flowing along the outside wall of the inner tube 122, the sensor 120 is located in a thermowell 130.

In addition, an adjusting device 132 is provided for calibrating the measurement apparatus in order to be able to indicate the flow rate using the sensed flow velocity.

Shown in a similar manner as in connection with FIG. 1, a fluid flows through the inner tube inlet 124 at a given flow velocity. Because of the increase in the inside diameter of the inner tube 122 in the region of the inner tube measurement section 128, the flow velocity of the fluid in the region of the inner tube measurement section 128 is reduced in comparison to the inner tube inlet 124 so that the sensor 120 in the inner tube measurement section 128 senses a lower flow velocity of the fluid than is present at the inner tube inlet 124. Since the sensor 120 can sense this lower flow velocity with higher precision, the flow velocity of the fluid is sensed with higher precision. The value of the flow velocity of the fluid sensed by the sensor can be converted in such a manner that the flow rate in the measuring tube can be indicated with high precision.

The embodiment shown in FIG. 2, in which the measurement of the flow velocity is accomplished using a partial flow measurement, has the advantage as compared to the embodiment shown in FIG. 1 that the angle of inclination $\beta$ between inner tube inlet 124 and inner tube measurement section 128 is smaller, for the same installation length of the embodiments, than the angle of inclination $\alpha$ between inlet 14 and measurement section 18, with the result that fewer backflows or eddies form in the inner tube measurement section 128 than in the measurement section 18. The measurement precision of the embodiment shown in FIG. 2 is further improved for high flow velocities of a fluid as compared to the embodiment shown in FIG. 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measurement apparatus comprising:
a measuring tube having an inlet and an outlet;

a thermal sensor for measuring a flow rate of a fluid flowing through the measuring tube, the thermal sensor being arranged in a measurement section of the measuring tube; and an inner tube having an inner tube inlet, an inner tube outlet, and an inner tube measurement section, the inner tube arranged in the measuring tube, wherein the inlet has an inlet inside diameter and the measurement section has a measurement section inside diameter, the measurement section inside diameter being greater than the inlet inside diameter, wherein the inner tube measurement section has an inside diameter that is greater than an inside diameter of the inner tube inlet, wherein the thermal sensor is arranged at the inner tube, wherein the inside diameter of the inner tube increases steadily from the inner tube inlet towards the inner tube measurement section and tapers steadily from the inner tube measurement section towards the inner tube outlet, and wherein the sensor is arranged at the inside wall of the inner tube in a region of the measurement section.

2. The measurement apparatus according to claim 1, wherein the inner tube is arranged essentially centered in the measuring tube.

3. The measurement apparatus according to claim 1, wherein an angle $\beta$, relative to the axis of the inner measuring tube, at which the inner tube increases steadily from the inner tube inlet towards the inner tube measurement section and tapers steadily from the inner tube measurement section towards the inner tube outlet, is as small as possible, preferably less than 30°.

4. The measurement apparatus according to claim 1, wherein an inside diameter ratio of the inner tube measurement section to the inner tube inlet is in a range from about 1.5 to 6.

5. The measurement apparatus according to claim 1, wherein an inside diameter ratio of the measuring tube inlet to inner tube inlet is in a range from about 2 to 5.

6. The measurement apparatus according to claim 1, wherein the thermal sensor for measuring the flow velocity is a sensor for a thermal anemometer.

7. The measurement apparatus according to claim 1, further comprising an adjusting device.

8. The measurement apparatus according to claim 1, wherein the measuring tube has a rectangular or elliptical cross-section.

9. The measurement apparatus according to claim 1, wherein the inner tube has a rectangular or elliptical cross-section.

* * * * *